Jan. 15, 1963  C. M. LEEDS ETAL  3,072,959
MACHINE FOR MAKING PLASTIC BOTTLES
Filed Dec. 15, 1959  3 Sheets-Sheet 1

INVENTORS
CARL M. LEEDS
FRANK A. CONNEL
BY ROSS C. HURREY
ATTORNEY

Jan. 15, 1963   C. M. LEEDS ETAL   3,072,959
MACHINE FOR MAKING PLASTIC BOTTLES
Filed Dec. 15, 1959   3 Sheets-Sheet 2

INVENTORS
CARL M. LEEDS
FRANK A. CONNEL
BY ROSS C. HURREY
ATTORNEY

United States Patent Office 3,072,959
Patented Jan. 15, 1963

3,072,959
MACHINE FOR MAKING PLASTIC BOTTLES
Carl M. Leeds, Augusta, Maine, Frank A. Connell, Chatham, N.J., and Ross C. Hurrey, Ashton, Md., assignors to Leedpak, Inc., New York, N.Y., a corporation of New York
Filed Dec. 15, 1959, Ser. No. 859,781
5 Claims. (Cl. 18—4)

It is an object of this invention to provide a machine for making bottles from a continuous web preformed of thermoplastic material.

It is a further object of this invention to provide, in a machine as aforesaid, means to test the bottles formed and to reject all leakers on or before discharge from the machine.

Figure 1:
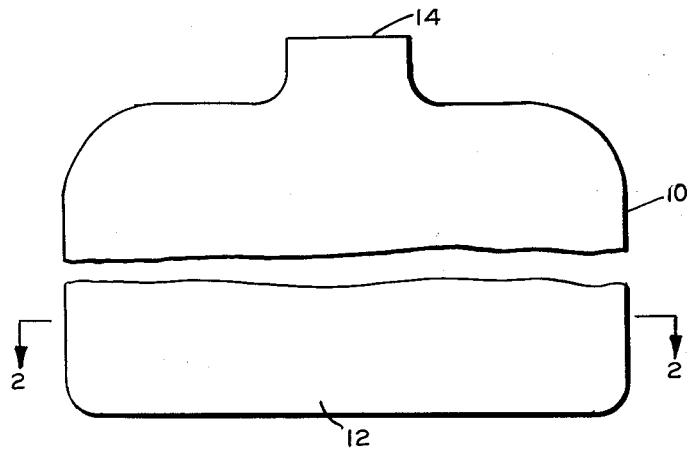
Figure 2:
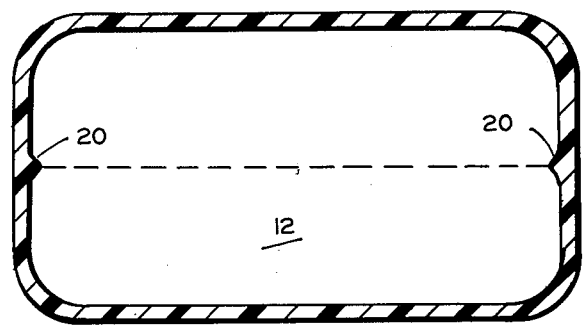
Figure 7:
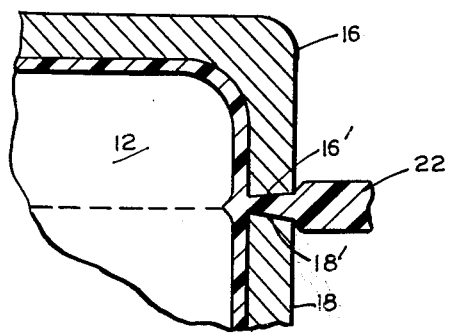
Figure 3:
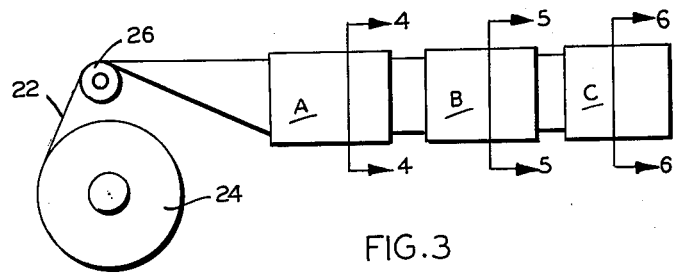
Figures 4, 4A, 4B:
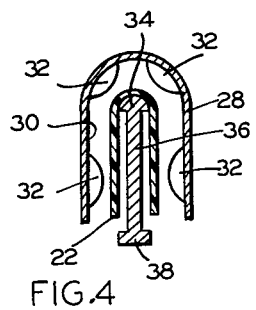
Figures 5, 5A:
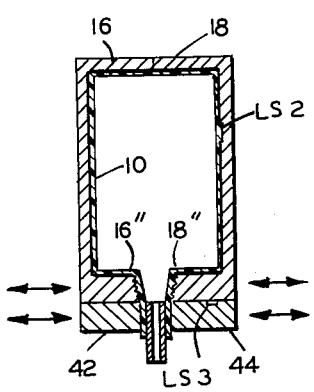
Figure 6:
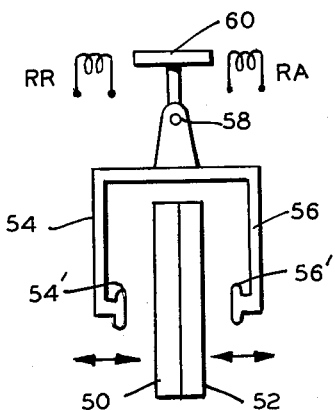
Figure 6A:
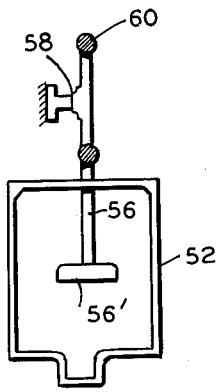
Figure 8:
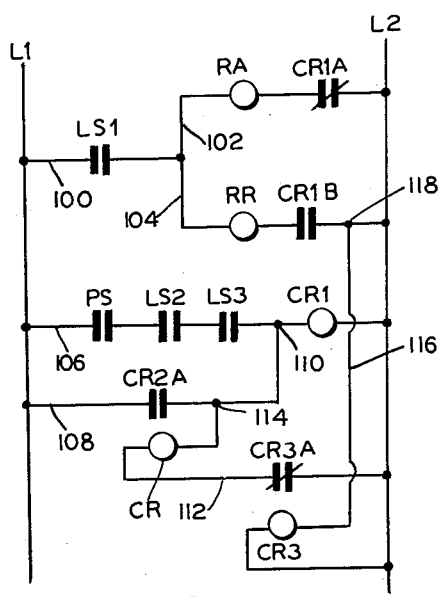

The above and other objects will be made clear from the following detailed description taken in connection with the annexed drawings in which:

FIGURE 1 is a front elevation of the bottle of this invention;
FIGURE 2 is a section on the line 2—2 of FIGURE 1;
FIGURE 3 is a schematic side elevation of the machine as a whole;
FIGURE 4 is a section on the line 4—4 of FIGURE 3;
FIGURE 4A shows an alternative of web or sheet formation;
FIGURE 4B shows a further alternative;
FIGURE 5 is a section on the line 5—5 of FIGURE 3;
FIGURE 5A is a view similar to FIGURE 5 showing the parts in testing position;
FIGURE 6 is a section on the line 6—6 of FIGURE 3;
FIGURE 6A is a partial section on the line 6A—6A of FIGURE 6;
FIGURE 7 is a detailed section of the meeting edges of the mold halves showing the extrusion of the interior bead; and
FIGURE 8 is a wiring diagram showing the means for rejecting unacceptable bottles.

Semi rigid bottles have been made heretofore out of various thermoplastic materials by methods quite analogous to those used in conventional glass blowing. Similar bottles have been formed from plastic sheets, but these have been limited in variety of contour, and have involved undesirable bottom structures. The present invention contemplates the formation of bottles in unlimited variety of contours, with smooth, flat, seamless bottoms, conventional bottle neck and closure formations, the bottles being formed from an initially continuous web of thermoplastic material. This is immensely advantageous to the custom packager, and the less-than-gigantic operator, who, by buying film, is relieved of the responsibility of formulating and extruding his own plastic. Moreover, in actual operations, occasional shut-downs have no effect on the film, but do have a most disturbing effect on an extruder. There is the further fact that inbound freight and inventory space requirements are far less for the film than would be the case in preformed bottles, to which, at present the less-than-gigantic operator is bound.

The term "preformed" as applied herein to a sheet or web, means that the sheet or web has been cast or extruded. Usually the preformed sheet or web will be homogenous but it is not intended to exclude coated or laminated sheets or webs.

The operations of the present invention may be summarized as follows:

A roll of thermoplastic material is unwound to provide a continuous web. This is folded upon itself (preferably) to inverted U or V form. A controlled heat source is placed within and about the U or V to heat what will become the inner surface of the bottles. Pyrometers sense the temperature of the web and are used for the temperature control of the heat source. The heated web is then guided between one or more sets of opposed mold halves. The halves of each mold may or may not be complementary. A nozzle is inserted between the margins of the folded web, a nozzle being provided for each pair of mold halves. The mold halves then close and fluid pressure is delivered by the nozzles to the interior of the folded film, forcing it into conformity with the mold. It is to be emphasized that the interior surface area of the mold exceeds the area of film trapped in the mold so that the film is stretched or oriented by expansion to conform to the mold. This can be most beneficial in the case of certain thermoplastics, such, for example, as the new polypropylene film. If a fluid tight bottle is desired, the film contacted by the mold edges may be heat sealed during the molding step. The heating means may be conventional and adapted to the nature of the film. As will be treated in detail hereinafter, the heat sealing is carried out to produce an inward extrusion of the material to form an interior bonding bead as strong as the original web. Any external flash remaining usually will be trimmed away to provide a smooth exterior finish.

When fluid tight bottles are formed, it is desirable to test these at once so that leakers will not be allowed to enter the filling and closing line. This is done by partially opening the mold halves while holding the bottle mouth sealed against the nozzle. Additional pressure is then supplied to expand the formed bottle. A sensing device will detect expansion sufficient to indicate a tight bottle. Failure of the sensing device to be actuated will result in the automatic discarding of the particular bottle.

The remaining steps are conventional: trimming and discarding waste and turning the bottles to rest on their bottoms when they may progress through conventional filling and closing equipment.

There are a few other possible operations to be discussed at this point. The word "possible" is not used in any subjunctive or hypothetical sense. These "possibilities" can and will be used for certain purposes. First, where additional thickness is desired at the neck, the margins of the web may be folded upon themselves before, or during the formation of the U or V fold, thus doubling the thickness of material in the neck region. Second, the nozzles may be used to convey a preformed neck insert into position to be sealed into the bottle as an integral part thereof.

In general, in the following description, detail has been avoided so far as possible. Means for feeding and folding the web, means for advancing and retracting nozzles and moldhalves, means for heating and heat sealing, etc. are all largely conventional, and the elements are selected rather than designed, and when selected, are subject to endless modification. To detail numerous conventional elements would be to burden this disclosure with a great deal of uninformative information.

Referring now to FIGURES 1, 2 and 7, there is shown a bottle 10 having a flat, seamless bottom 12 and a neck 14. As will be discussed hereinafter, the bottle is blow-molded from a section of preformed plastic film. The film is folded to inverted U or V form prior to entry into moldhalves 16 and 18 as shown in FIGURE 7. As the film enters the moldhalves it has been preheated to a softened condition. The moldhalves 16 and 18 have respectively opposed edges 16' and 18' which are beveled as shown in FIGURE 7. Since the film from which the bottle is formed is continuous, a double layer of film will lie between and extend beyond the edges 16' and 18' of the moldhalves 16 and 18. The portion of the moldhalves overlying the bottom 12 need merely meet and need not be beveled. The bottom 12 is formed by the apex of the inverted U or V of the film and is, therefore, seamless, showing at most a faint trace of the mold parting line.

When the beveled edges 16' and 18' approach each other they engage the double thickness of softened film. For this purpose, a relatively thick film is used running in caliper between 0.005" and 0.010" or more, depending on the size and shape of the bottle and the nature of the thermoplastic film. In the film of 0.010" caliper, there will be combined thickness of 0.020".

It will be noted in FIGURE 7 that the depth of the edges 16' and 18' of the moldhalves 16 and 18 is much greater than the thickness of the film from which the bottle is formed. It will be noted further that the bevel of these edges is slight. A substantial volume of film is caught between the edges 16' and 18'. At the temperatures and pressures involved, the material of the film is, for all practical purposes, incompressible. As the edges 16' and 18' approach each other, the material of the film will coalesce and will tend to flow laterally between the edges from the approximate center of the edges toward both the interior and exterior of the mold. The portion of the film material flowing inwardly forms the interior beads 20 shown in FIGURE 2.

The bevel of the edges 16' and 18' is slight. If no bevel were provided there would always be a perceptible flash left on the outside of the bottle, but the interior bead would form, nevertheless. With the bevel, in most cases, the flash will either be pinched off completely or so little will be left as to be virtually imperceptible.

Referring now to FIGURE 3, a web 22 is drawn from a supply roll 24 over an idler 26, after which, by means of a conventional former plate, it is folded upon itself to an inverted U or V form in which condition it passes through a preheated station designated A, thence to a forming and testing station generally designated B, thence to a trimming and classification station designated generally C. At present, the web is advanced step by step with the molding and trimming operations occurring in a dwell between steps. When sufficient demand for containers of this type has been demonstrated, continuous operation will be adopted as a matter of course and such operation is to be considered as entirely within the purview of this invention. At present the step by step feed is accomplished by opposed jaws which move toward each other to grip the web, then advance one feeding step, at the end of which they release the web and are retracted to their initial condition. This is an entirely conventional feed, susceptible of many variations in detail, most of which are thoroughly disclosed in the prior art, for which reason detailed disclosure is not considered necessary here.

FIGURE 4 is a representative cross-section taken on the line 4—4 through the preheating station A indicated in FIGURE 3. This section is made up of an exterior hood 28 having an interior reflective surface 30 in which are mounted radiant heat bulbs 32. The web 22 is supported on an extension 34 of the conventional former plate above noted. A heating element 36 is mounted on a rail 38 inside the U or V fold of the web 22. The element 36 preferably comprises one or more fine gauge filaments having minimum thermal inertia to facilitate close control of the temperature attained by the web 22.

It is sometimes desirable to have greater thickness of material adjacent the neck of the bottle than is required in the body of the bottle itself. FIGURES 4A and 4B show this may be accomplished. In FIGURE 4A a web 200 has its margins 202 and 204 folded one or more times upon themselves. The folding is accomplished by conventional means and should be done before the web proper is brought to the condition shown in the figure. Whether the folds are on the outside as shown or on the inside will be dictated by the nature of the intended contents.

In FIGURE 4B a web 210 is folded just as in FIGURE 4. Adjacent its margins 212 and 214 are fed one or more strips 216 of plastic material. The result is a lamination of plastic in the region of the bottle mouths. This has the great advantage of permitting the selection of various materials, supplementary one to the other.

It is perfectly possible to extrude film of varying caliper across its width. Such areas of increased thickness may be used in place of the folds of FIGURE 4A or the supplemental strips of FIGURE 4B. Also, as previously noted, when the film stretches in the molding operation there may take place a thinning of the caliper of the film. This may be compensated and uniform caliper maintained throughout the body of the bottle (except, perhaps at the neck and/or shoulders) by originally increasing the caliper of the web in those areas which otherwise would be thinned by stretching.

FIGURES 5 and 5A are sections taken generally on the line 5—5 of the molding and testing station B of FIGURE 3 and illustrate a pair of opposed moldhalves 16 and 18 previously discussed in connection with FIGURES 1, 2 and 7. It will be understood that station B of FIGURE 3 may contain a plurality of sets of moldhalves so that a single actuation of a station will form and test a plurality of bottles. The several sets of moldhalves may all be of the same configuration or each may differ from the others. Regardless of configuration, however, the action of each set of moldhalves is the same as the others.

In FIGURE 5 the moldhalves 16 and 18 are shown fully engaged. At the base of each half is a threaded portion 16" on the half 16 and 18" on the half 18. The threaded portions 16" and 18" are spaced slightly from a nozzle 40 which has sealing engagement with slides 42 and 44. The slides 42 and 44 move with the halves 16 and 18 from a fully open retracted position to the position shown in FIGURE 5. The nozzle 40 is vertically movable from the active position shown in FIGURE 5 to a vertically lower position in which it is entirely clear of the slides 42 and 44.

Under the conditions of FIGURE 5 the preheated web 22 is trapped between the moldhalves 16 and 18 and the slides 42 and 44, with the web 22 forming a gasket between the latter and the nozzle 40. The area of the web thus trapped is less than the area of the interior of the mold and when fluid pressure is supplied to the nozzle 40 through a connection 40', the web will stretch into precise conformity with the cavity, including the threaded portions 16" and 18".

Depending on the kind and caliper of the web 22, it may be desirable to heat the meeting edges of the halves 16 and 18. In the case of vinyl, polymers and copolymers, dielectric heating by the imposition of high frequency oscillations will be effective. In the case of the polyolefins in general and polyethylene in particular, heat sealing of the "impulse" type will be most effective. In any case, the heating means will be largely conventional and an excellent survey of methods and apparatus for this purpose is contained in Modern Packaging Encyclopedia, issue for 1959, vol. 32, No. 3A, pages 466–471.

One or both of the moldhalves 16 and 18 contain normally closed contacts of a limit switch LS2, while in the base of one of the halves and its adjacent slide are normally open contacts of a limit switch LS3. The purpose and functioning of these switches will be described hereinafter.

Immediately upon completion of the forming step, the moldhalves 16 and 18 retract to the position shown in FIGURE 5A, leaving the slides 42 and 44 in sealing engagement with the nozzle 40 and closing the normally open contacts of the switch LS3. The bottle 10, at this point, is clear of the vertical walls of the halves 16 and 18 which permits opening of the normally closed contacts of the switch LS2. A predetermined fluid pressure is then applied to the nozzle 40. If the bottle 10 has been perfectly sealed, this internal pressure will expand the bottle to close the contacts of LS2. If, however, the bottle is a leaker, sufficient expansion will not occur. Immediately after this application of pressure, slides 42 and 44 retract from the nozzle 40 and then move with the halves 16 and 18 to fully retracted position. At the same time, the nozzle 40 is vertically lowered below the underside of the slides 42 and 44 to permit a feeding of the thus formed bottles from the forming and testing station B to the trimming and accepting station of FIGURE 3.

Referring now to FIGURES 6 and 6A there is illustrated, schematically, the trimming and acceptance station C shown in FIGURE 3. Mechanically, the station is very simple, comprising a pair of trimming dies 50 and 52 shaped to conform to the side seams of the bottle 10 and to trim away all flash in these areas leaving the bottle 10 with a smooth exterior. Conventional means are used to cause the dies 50 and 52 to move toward and from each other in timed relationship to the forming and testing operations of station B.

The precise form of the trimming dies is wholly immaterial. In most cases a shearing action is preferred, but whether this is of the "pinching" type, that is, a sharp edge against a blunt anvil, or by the engagement of sharp edges which cross each other depends on the nature of the material to be trimmed and, in detail, will be quite conventional. At any rate, the detail of the trimming operation forms no part of the present invention.

For the purpose of accepting or rejecting bottles as determined by station B, as will be described hereinafter, a pair of arms 54 and 56 are pivoted at 58 above the trimming dies 50 and 52. The mounting is such that if, as viewed in FIGURE 6, the arms swing clockwise, a bar 56′ on the arm 56 will swing through the dies to knock the bottle to the left into the "accepted" category. A counter-clockwise swing, however, will cause a similar bar 54′ to pass through the dies and knock to the right a bottle which has failed the test at station B. The "accept" swing is governed by a relay RA and the "reject" swing is governed by a relay RR, each acting on an armature 60 forming an extension of the arms 54 and 56 above the pivot 58.

The particular means of testing hereinafter disclosed is based on minimum volumetric expansion under applied internal pressure. With very little change, the test equally well can be based on pressure drop and no doubt other ways will suggest themselves to those skilled in the art.

The variety of ways to actuate the machine parts and stations heretofore described is very great, and the several ways, at this date, largely are conventional. Probably the simplest arrangement is a camshaft on which are mounted circumferentially adjustable cams. A cam is provided for each operation and at the proper time in the cycle closes a switch to actuate the operation assigned to it. The time of initiation and the duration may be governed by proper circumferential setting of the cam. Where duration may be variable within a given overall time, the cam may start a settable timer which then takes over initiation and duration of the action. Preferably the actual physical movements of the parts is done by fluid pressure, either hydraulic or pneumatic as the designer may desire. In such case the cams and timers usually will energize solenoids which in turn actuate valves for controlling the pistons and cylinders which in turn move the actual parts. In such an arrangement, there is no need for proximity between the control elements and the parts controlled thereby. For this reason, the physical set-up is a matter of convenience, and no useful purpose would be served by a detailed disclosure herein of any particular arrangement.

It is clear that no single combination of procedural details will be optimum for all combinations of sheet kind and caliper, product size and shape, and product end use. Among optional procedures may be mentioned; expanding the bottles with a sterilizing or inert gas; preheating the expansion gas, and rendering moldhalves porous to relieve air entrapped between the mold walls and the expanding bottle walls.

In FIGURES 5 and 5A, slide 42 and associated halfmold 16 move as a unit toward slide 44 and its associated halfmold 18, which, at the same time similarly advances. When sealing contact between the halfmolds is established, fluid pressure is applied to line 40′ and the bottle is molded. When the molding step is complete (usually determined by a settable timer) pressure in line 40′ is lowered and the halfmolds 16 and 18 are retracted to the position of FIGURE 5A. This is done either by a timer actuated valve, or a sequence valve, or in any other suitable manner. Retraction of a halfmold 18 from the molded bottle 10 permits opening of the limit switch LS2 while the shifting of the halfmold 18 on its slide 44 closes limit switch LLS3. Testing pressure is then connected to the line 40′ (using a cam or timer actuated valve in which a pressure switch is located, as indicated in FIGURE 8) and this tends to expand the now unsupported bottle 10. If the bottle is tight, that is, free of leaks, the expansion of the bottle walls will bring it into contact with LS2 and thus upon those contacts. If the bottle leaks, the contacts LS2 will remain closed. As noted hereinafter in connection with FIGURE 8, acceptance or rejection occurs at station C, necessarily during the next cycle, when the accept-reject station has its chance at the bottles formed and tested during the preceding cycle. The "findings" of the test station therefore must be stored and made available to the accept-reject station the next succeeding cycle.

Referring now to FIGURE 8, there are shown power lines L1 and L2. A normally open limit switch LS1 connects a line 100 to parallel branches 102 and 104. A relay RA is placed in the line 102 and actuates whatever valves and relays may be required to kick out a trimmed bottle into the "accpeted" depository. Normally closed contacts designated as CR1a are included in the circuit 102 and joint this circuit to the line L2.

In the circuit 104 is included a solenoid designated as RR which actuates whatever valves or relays are required to kick out a bottle to the opposite or "reject" side. The circuit 104 includes in series with the relay RR normally open contacts CR1b and thence goes to line L2.

The limit switch LS1 is closed upon mating of the bottle trimming dies and in practice, ordinarily will energize the "acceptable" solenoid RA through the normally closed contacts CH1a.

At the molding station B is a line 106 which contains in series normally open contacts of a pressure switch PS, the contacts of a limit switch LS2 and normally open contacts of a limit switch LS3. Also included in the circuit is a solenoid CR1 which controls the contacts CR1a of circuit 102 and CR1b of circuit 104. Energizing of solenoid CR1 opens the normally closed contacts CR1a of circuit 102 and closes the normally open contacts CR1b of circuit 104.

Pressure switch PS in circuit 106 is closed on the attainment of a predetermined pressure in the air line 40′ feeding the pressure nozzle 40. Limit switch LS2 is closed except when the bottle wall exerts mechanical pressure against it. Limit switch LS3 is open at all times except when the moldhalves 16 and 18 are partially retracted from the slides 42 and 44 as hereinbefore described. Under the condition of partial retraction, however, contacts LS3 are closed so that closure of the pressure switch PS, while the contacts LS3 and LS2 both are closed, will complete the circuit 106 through the solenoid CR1, thus opening contact CR1a in circuit 102 and closing contacts CR1b in circuit 104 thereby conditioning circuit 104 for rejection of a bottle upon closing of LS1 by mating of the trimming dies 50 and 52.

Since performance of a complete cycle of the molding dies is prerequisite to acceptance or rejection of one or more bottles at the next operation of the trimming dies, it is necessary to lock the circuits established pursuant to a cycle of the molding dies until the next operation of the trimming dies.

To do this, a circuit 108 runs from line L1 through normally open contacts CR2a, thence to a junction 110 in line 106. A second line 112 runs from a junction 114 in line 108 through a solenoid CR2 thence through normally closed contacts CR3a to line L2. A circuit 116 runs from a junction 118 in line 104 through a solenoid CR3 and thence of L2.

In the case for rejection of a bottle, contacts PS, LS2 and LS3 all will be closed, energizing solenoid CR1 with the results previously described. Solenoid CR2 under these circumstances, will be energized via contacts 110 and 114 and line 112, closing contacts CR2a to maintain a circuit through CR1, thus holding solenoid RR in condition to reject a bottle. Upon mutual approach of the trimming dies, LS1 closes to energize rejection solenoid RR through circuits 100 and 104 and the now closed contact CR1b. The closure of this circuit simultaneously, through contact 118 and line 116, energizes solenoid CR3 momentarily to open normally closed contacts CR3a thus deenergizing solenoid CR2 and unlocking the circuit through CR1 and reestablishing the initial conditions.

It is to be noted that the cycles of stations B and C are not coextensive, the only requirement being that both be completed in the interval between feeding steps. The dwell between the end of one feeding step and the beginning of the next is fixed by the time requirements of station B and this will be the longest of any station. The requirements of station C are only fractional by comparison, and, in fact, do not require "timing" at all in the sense of station B. Conclusion of the forming and testing step has stored all the "information" needed by station C. Actuation of station C may usefully be triggered by completion of the feeding step. This will occur during the earliest part of the station B cycle. Station C will complete its action almost immediately, and, as described above, completion of the station C cycle will reset all circuits to initial condition well before occurrence of the testing part of the cycle of station B.

What is claimed is:

1. Apparatus for forming bottles from a folded, heated sheet of thermoplastic material comprising: a molding station; a trimming station; means for feeding bottles from the molding station to the trimming station; means operative following a molding operation for supplying fluid pressure testing pressure to the bottle just molded; means operative at the trimming station for rejecting defective bottles; means responsive to the testing pressure for actuating the rejecting means; and means for deferring the operation of the rejecting means until the next operation of the trimming means.

2. Apparatus as set forth in claim 1 including means actuated by each operation of the trimming means for reconditioning the testing, deferring and rejecting means for a subsequent operation.

3. Apparatus for forming bottles from a sheet of thermoplastic material comprising: a molding station; a defective bottle rejecting station; means for feeding molded bottles from the molding station to the rejecting station; means at the molding station operative following a molding operation for supplying fluid pressure testing pressure to the bottle just molded; means operative at the rejecting station for rejecting tested, defective bottles; sensing means operative at the molding station for conditioning the rejecting means for operation; and means to defer the operation of the rejecting means until a tested bottle is at the rejecting station.

4. Apparatus as set forth in claim 3 including means actuated by each operation of the rejecting means for reconditioning the testing, deferring and rejecting means for a subsequent operation.

5. Apparatus for forming bottles from a folded, heated sheet of thermoplastic material comprising: a molding station; a trimming station; means for feeding bottles from the molding station to the trimming station; said molding station including opposed moldhalves, each of said moldhalves having a seam forming edge complementary of the opposed edge of the other; the seam forming edges of each of the moldhalves sloping slightly from the interior expansively toward the exterior of the mold to produce and guide an inward extrusion of the thermoplastic to form inwardly directed seams whereby the trimming station can operate close to the body of the bottle; means operative following a molding operation for supplying fluid pressure testing pressure to the bottle just molded; means operative at the trimming station for rejecting defective bottles; means responsive to the testing pressure for actuating the rejecting means; and means for deferring the operation of the rejecting means until the next operation of the trimming means.

References Cited in the file of this patent

UNITED STATES PATENTS

| 2,314,310 | Jackson et al. | Mar. 16, 1943 |
| 2,370,945 | Fields | Mar. 6, 1945 |
| 2,401,564 | Hofmann | June 4, 1946 |
| 2,499,399 | Lyon | Mar. 7, 1950 |
| 2,538,684 | Gushard et al. | Jan. 16, 1951 |
| 2,582,449 | Millar | Jan. 15, 1952 |
| 2,787,023 | Hagen et al. | Apr. 2, 1957 |
| 2,790,994 | Cardot et al. | May 7, 1957 |
| 2,792,593 | Hardgrove | May 21, 1957 |
| 2,821,851 | Daley | Feb. 4, 1958 |
| 2,860,801 | Nielsen | Nov. 18, 1958 |
| 2,890,485 | Knowles | June 16, 1959 |
| 2,918,698 | Hagen et al. | Dec. 29, 1959 |
| 2,943,349 | Adams et al. | July 5, 1960 |

FOREIGN PATENTS

| 747,434 | Great Britain | Apr. 4, 1956 |